US011991300B2

(12) United States Patent
Peng

(10) Patent No.: US 11,991,300 B2
(45) Date of Patent: May 21, 2024

(54) PHOTOGRAPHING METHOD AND APPARATUS, TERMINAL, AND STORAGE MEDIUM

(71) Applicant: BEIJING XIAOMI MOBILE SOFTWARE CO., LTD., Beijing (CN)

(72) Inventor: Cong Peng, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 493 days.

(21) Appl. No.: 17/238,134

(22) Filed: Apr. 22, 2021

(65) Prior Publication Data
US 2022/0094772 A1 Mar. 24, 2022

(30) Foreign Application Priority Data
Sep. 23, 2020 (CN) .......................... 202011009222.1

(51) Int. Cl.
H04M 1/72403 (2021.01)
H04M 1/02 (2006.01)
H04N 23/51 (2023.01)
H04N 23/57 (2023.01)
H04N 23/62 (2023.01)

(52) U.S. Cl.
CPC .......... *H04M 1/0264* (2013.01); *H04N 23/51* (2023.01); *H04N 23/57* (2023.01); *H04N 23/62* (2023.01)

(58) Field of Classification Search
None
See application file for complete search history.

(56) References Cited

U.S. PATENT DOCUMENTS

| 2017/0123453 | A1 | 5/2017 | Evans et al. |
| 2020/0134282 | A1 | 4/2020 | Tian |
| 2021/0247621 | A1* | 8/2021 | Yang .................... G01B 11/254 |
| 2021/0306533 | A1 | 9/2021 | Zhou |
| 2023/0030179 | A1* | 2/2023 | Chen ....................... G09G 5/10 |

FOREIGN PATENT DOCUMENTS

| CN | 108051370 A | 5/2018 |
| CN | 108307125 A | 7/2018 |
| CN | 108650443 A | 10/2018 |
| CN | 108716950 A | 10/2018 |
| CN | 108924306 A | 11/2018 |

(Continued)

OTHER PUBLICATIONS

First Office Action of the Chinese application No. 202011009222.1, issued on Aug. 25, 2021, (15p).

(Continued)

*Primary Examiner* — Willie J Daniel, Jr.
(74) *Attorney, Agent, or Firm* — Arch & Lake LLP

(57) ABSTRACT

A photographing method and apparatus, a terminal, and a storage medium are provided. The method is applied to a terminal including a camera and a display screen, and the camera is disposed under the display screen, and the method includes: determining a first optical signal value acquired by the camera at the time of photographing; determining a screen influence value of the display screen based on at least a second optical signal value acquired by a light sensor; and generating an image based on the first optical signal value and the screen influence value.

12 Claims, 5 Drawing Sheets

(56) References Cited

FOREIGN PATENT DOCUMENTS

| CN | 109348123 | A | | 2/2019 | |
|----|-----------|---|---|--------|---|
| CN | 110806665 | A | | 2/2020 | |
| CN | 111049973 | A | | 4/2020 | |
| CN | 111050050 | A | * | 4/2020 | |
| CN | 111050050 | A | | 4/2020 | |
| CN | 111367121 | A | * | 7/2020 | ....... G02F 1/133514 |
| CN | 111367121 | A | | 7/2020 | |
| EP | 3885723 | A1 | | 9/2021 | |

OTHER PUBLICATIONS

Supplementary European Search Report in European application No. 21170416.8, mailed on Oct. 11, 2021, (9p).

* cited by examiner

US 11,991,300 B2

PHOTOGRAPHING METHOD AND APPARATUS, TERMINAL, AND STORAGE MEDIUM

CROSS-REFERENCE TO RELATED APPLICATION

This application is based on and claims priority to Chinese Patent Application No. 202011009222.1 filed on Sep. 23, 2020, the content of which is hereby incorporated by reference in its entirety.

TECHNICAL FIELD

The present disclosure relates to the field of electronic technology, and particularly, to a photographing method and apparatus, a terminal, and a storage medium.

BACKGROUND

With the rapid development of electronic technology, terminal devices such as full-screen smartphones and tablet computers have become increasingly popular. Generally, a terminal device is provided with a camera under its screen, and the under-screen camera has become a preferable solution of full screen.

SUMMARY

The present disclosure provides a photographing method and apparatus, a terminal, and a storage medium.

According to a first aspect of examples of the present disclosure, there is provided a photographing method, which is applied to a terminal including a camera and a display screen, the camera being disposed under the display screen, the method may include the following steps. A first optical signal value acquired by the camera is determined at the time of photographing through the camera. A screen influence value of the display screen is determined based on at least a second optical signal value acquired by a light sensor. An image is generated based on the first optical signal value and the screen influence value.

According to a second aspect of the examples of the present disclosure, there is provided a terminal including a processor and a memory for storing instructions executable by the processor. The processor is configured to determine a first optical signal value acquired by the camera at the time of photographing; determine a screen influence value of the display screen based on at least a second optical signal value acquired by a light sensor; and generate an image based on the first optical signal value and the screen influence value.

According to a third aspect of the examples of the present disclosure, there is provided a storage medium. When the instructions in the storage medium are executed by a processor of a terminal, the instructions cause the processor to perform determining a first optical signal value acquired by the camera at the time of photographing; determining a screen influence value of the display screen based on at least a second optical signal value acquired by a light sensor; and generating an image based on the first optical signal value and the screen influence value.

It is to be understood that the foregoing general description and the following detailed description are exemplary and explanatory only and are not restrictive of the disclosure.

BRIEF DESCRIPTION OF THE DRAWINGS

The drawings, which are incorporated in and constitute a part of this specification, illustrate examples consistent with the present disclosure and, together with the specification, serve to explain the principles of the disclosure.

DETAILED DESCRIPTION

Figure 1:
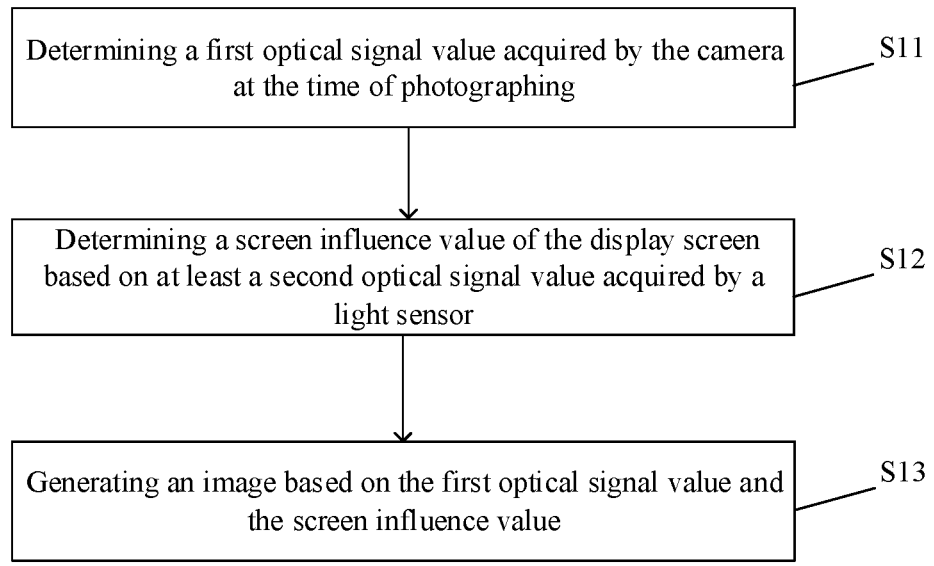
FIG. 1 is a flowchart of a photographing method according to examples of the present disclosure.

Examples will be described in detail herein, examples of which are illustrated in the drawings. When the following description refers to the drawings, the same numbers in different drawings indicate the same or similar elements unless otherwise indicated. The examples described in the following examples do not represent all examples consistent with the present disclosure and they are merely examples of devices and methods consistent with some aspects of the disclosure.

When the under-screen camera is used for photographing, the current solution is to use a screen of a special material in the camera part, so that the camera can acquire a part of the external light and then use it for imaging. However, the quality of the image obtained based on the above-mentioned imaging scheme is not good enough.

FIG. 1 is a flowchart of a photographing method according to examples of the present disclosure. As shown in FIG. 1, the photographing method is applied to a terminal including a camera and a display screen, the camera being disposed under the display screen. The photographing method includes the following operations.

In S11, a first optical signal value acquired by the camera is determined at the time of the camera photographing.

In S12, a screen influence value of the display screen is determined based on at least the second optical signal value acquired by the light sensor.

In S13, an image is generated based on the first optical signal value and the screen influence value.

In the examples of the present disclosure, a terminal device includes a mobile device and a fixed device. The mobile device includes a mobile phone, a tablet computer, a wearable device, or the like. The fixed device includes, but is not limited to, a Personal Computer (PC).

The terminal device includes a display screen capable of displaying an image. The terminal device is also provided with an under-screen camera capable of acquiring the image. For example, the display screen is an Organic Light-Emitting Diode (OLED) display screen, and generally, on the display screen, an under-screen camera is able to perform imaging by receiving ambient light based on gaps between display units. However, due to influence from the backlight of the display screen, the external ambient light acquired by the under-screen camera is influenced by the backlight of the screen.

In view of this, in the present disclosure, the screen influence value of the display screen is firstly determined, and the image is generated according to the first optical signal value acquired by the camera at the time of photographing and the determined screen influence value, so as to reduce the influence of the screen backlight.

In S11, the terminal determines the first optical signal value acquired by the camera at the time of photographing by the camera. It is to be understood that the first optical signal value acquired by the camera at this time is a value based on both the screen light of the display screen and the ambient light. For example, the display screen is in a color display mode, in the examples of the present disclosure, the first optical signal value may be understood as a value of color information corresponding to both the screen light and the ambient light.

In S12, the terminal determines the screen influence value of the display screen based on at least the second optical signal value acquired by the light sensor. It should be noted that the second optical signal value may include optical signal values at different wavelengths obtained by the light sensor acquiring the optical signal according to color channels. For example, in the case of three color channels of red (R), green (G) and blue (B), the light sensor may acquire optical signal values of red light, green light and blue light respectively. The screen influence value determined based on the second optical signal value may also be optical signal values at different wavelengths, that is, optical signal values at different color channels. For example, the screen influence value may be an optical signal value corresponding to each of the three color channels R/G/B for the display screen.

In addition, in the examples of the present disclosure, the light sensor may be a sensor located inside the terminal, or may be a sensor independent of the terminal device.

In an example, the S12 includes the following operation.

A second optical signal value that is acquired for the display screen of a current luminance by the light sensor in a dark room environment is determined as the screen influence value of the display screen. Luminance of ambient light in the dark room environment is less than a preset luminance threshold.

In the example, the light sensor may be a sensor inside the terminal or may be a sensor independent of the terminal device. When the terminal device is in a dark room environment, since the luminance of the ambient light is less, for example, the luminance of the ambient light is less than the preset luminance threshold of 0.02 lux, it can be understood that the light collected by the light sensor comes from the display screen.

In the examples of the present disclosure, screen influence values at different luminance levels of the display screen may be acquired in an experimental environment (namely in the dark room environment) through internal or external light sensors, and then stored in the terminal device.

In an example, when the light sensor is located in an electronic device and independent of a terminal device, the terminal device and the electronic device are located in a dark room environment, and when the terminal device displays at different luminance levels, the electronic device acquires second optical signal values corresponding to the different luminance levels by using the internal light sensor, and sends the second optical signal values to the terminal device of the present application, and the terminal device receives and stores the second optical signal values.

It will be appreciated that the second optical signal values corresponding to different luminance levels are obtained by an external light sensor of a terminal, and thus there is no need to for a light sensor to be built in the terminal, which enables to simplify the structure of the terminal and reduce the size of the terminal.

In an example, the second optical signal value acquired for the display screen of the current luminance is: an optical signal acquired for the display screen when the light sensor is disposed under the display screen and is adjacent to the camera.

In the example, the light sensor is an internal sensor in the terminal, which is located under the display screen and is adjacent to the camera. Therefore, in the dark room environment, the optical signal of the display screen acquired by the light sensor is substantially consistent with the optical signal of the display screen influencing the camera. As a result, in the experimental environment, the terminal device may acquire the second optical signal values corresponding to the different luminance levels by using the light sensor disposed under the display screen and adjacent to the camera and store the same.

It should be noted that in the example, the second optical signal value corresponding to a different luminance level obtained in the dark room environment may be obtained when the terminal is tested before leaving the factory. For example, before the display screen and the motherboard of the terminal are assembled, the light sensor is placed under the display screen, with an orientation same as that of the display screen, and acquires and stores a second optical signal value corresponding to a different luminance level. It will be appreciated that acquisition using the light sensor that is disposed under the display screen and has the same orientation as that of the display screen allows to obtain more accurate second optical signal value, that is, the screen influence value is more accurate.

In addition, it should be noted that in the present disclosure, the adjacent arrangement of the camera and the light sensor includes that no other object is inserted between the camera and the light sensor to minimize the spacing between the camera and the light sensor. Exemplary, such adjacent arrangement without inserting other objects includes, but are not limited to, contact arrangements of a camera and a light sensor.

Figure 2:
FIG. 2 is a schematic diagram of positions of a light sensor and a camera in an exemplary terminal.

FIG. 2 is a schematic diagram of positions of a light sensor and a camera in an exemplary terminal. As shown in FIG. 2, a screen display area A3 is formed within a screen frame A4 of the terminal, and a light sensor A1 and a camera A2 are disposed under the screen in the screen display area A3. A light transmission area Q is provided around the light sensor A1 and the camera A2, that is, a light receiving area for the light sensor A1 and the camera A2. When the light sensor A1 and the camera A2 detect and obtain luminance information of the ambient light through the light receiving area Q, both the light sensor A1 and the camera A2 are easily influenced by the luminance of display screen.

Based on the optical signal values at various luminance levels stored in the terminal device, the terminal device may query a second optical signal value corresponding to the luminance level to which the current luminance belongs, where the second optical signal value is a screen influence value of the display screen. It should be noted that the current luminance refers to the backlight luminance of the display screen at the time of the camera photographing in S11, and the second optical signal value may be the color information value of the screen light.

It may be appreciated that in the example, the second optical signal value obtained in the dark room environment is determined as the screen influence value of the display screen. Since the dark room environment is an experimental environment, the screen influence value obtained in this manner has a characteristic of high accuracy, which allows the terminal device to better remove the influence of the screen backlight, so that the generated image is more realistic and of high quality.

In another example, the method further includes the following operation.

At the time of the camera photographing, ambient light is acquired by a light sensor under the display screen to obtain the second optical signal value.

The operation that screen influence value of the display screen is determined based on at least the second optical signal value acquired by the light sensor may include that:

the second optical signal value of the ambient light acquired by light sensor is subtracted from the first optical signal value to obtain the screen influence value of the display screen.

In the example, a light sensor under the display screen in the terminal device is used to acquire ambient light to obtain a second optical signal value. For example, the light sensor in the terminal device is installed under the display screen but opposite to the orientation of the display screen, so that the second optical signal value of the ambient light can be acquired more accurately by the light sensor.

The first optical signal value acquired when the camera photographs includes the ambient light influence value and the screen influence value, and thus the second optical signal value from the ambient light acquired by the light sensor is subtracted from the first optical signal value to obtain the screen influence value of the display screen.

It should be noted that in the examples of the present disclosure, the first optical signal value may include optical signal values at different wavelengths, and when the second optical signal value acquired by the light sensor is subtracted from the first optical signal value, it be may that optical signal values having the corresponding wavelengths are subtracted. For example, an optical signal value having the red wavelength in the second optical signal value is subtracted from an optical signal value having the red wavelength in the first optical signal value.

Since the backlight of the display screen may be automatically adjusted and the backlight may have different luminance values at different times, in order to more accurately obtain the screen influence value, it is required to obtain the second optical signal value by acquiring the ambient light using the light sensor based on the time at which the camera acquires an image, for example, at the same time when the camera acquires the image or within a predetermined time duration. It is to be noted that the closer the time at which the ambient light is acquired to obtain the second optical signal value to the time at which the camera acquires the image, the better it is.

It may be appreciated that in the example, the second optical signal value of the ambient light is obtained in real time by the light sensor in the terminal, and the screen influence value is obtained by subtracting the second optical signal value from the first optical signal value. The components of the terminal itself are used in the above manner, so that the method is simple and efficient.

In S13, the terminal generates the image based on the first optical signal value and the screen influence value. As described above, the first optical signal value is based on both the screen light and the ambient light, and the screen influence value is based on the screen light alone, and as a result, the signal value from the ambient light can be obtained by subtracting the screen influence value from the first optical signal value, and the image is generated based on the value of the ambient light for displaying on the display screen.

In an example, the screen influence value includes a light emission spectral value of the screen. S13 includes the following operations.

A difference between the first optical signal value and the light emission spectral value is calculated according to different wavelength components corresponding to different spectrums, to obtain color values of the image at the corresponding wavelength components.

The image is obtained based on the color values.

In the example, the screen influence value includes the light emission spectral value of the screen, the light emission spectral value of the screen includes signal values corresponding to lights having different wavelengths, and a light having a different wavelength corresponds to a different color. Therefore, according to different wavelength components corresponding to different spectrums, a difference between the first optical signal value and the signal values in the light emission spectral value can be obtained respectively, and color values at different wavelength components are obtained.

For example, the first optical signal value includes signal values corresponding to four color components of transparent color (C), red color (R), green color (G), and blue color (B). The light emission spectral value of the screen also includes signal values corresponding to the color components of C, R, G, and B. Therefore, each signal value corresponding to a respective color component in the light emission spectral value of the screen is subtracted from that of the corresponding color component in the first optical signal value. For example, a respective influence value corresponding to each of the C\R\G\B is respectively subtracted from the first optical signal value for each pixel according to C\R\G\B, to obtain respective updated color values for each pixel, namely signal values from the ambient light. The image can be obtained based on the signal values at different colors corresponding to each pixel.

It will be appreciated that in the examples of the present disclosure, the terminal device determines the screen influence value of the display screen based on the second optical signal value acquired by the light sensor, and removes the influence of the screen luminance on the camera based on the first optical signal value and the screen influence value acquired when the camera photographs to obtain the signal value of the ambient light for generating the image. In this manner, the generated image can restore the photographed object more accurately, thereby improving the photographing quality.

Figure 3:
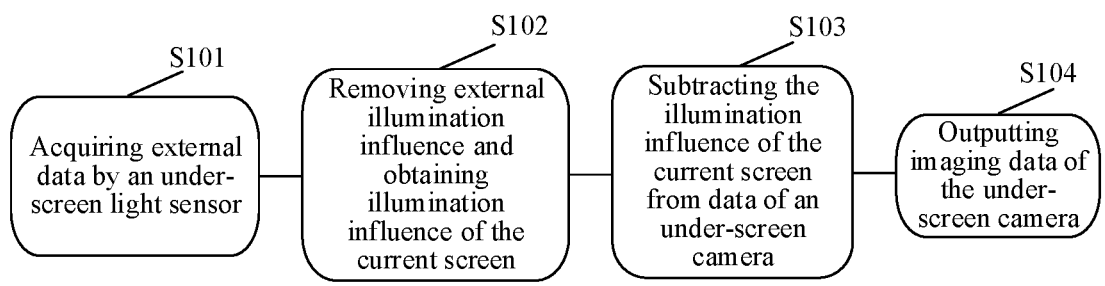
FIG. 3 is a flowchart of an example of a photographing method according to examples of the present disclosure.

FIG. 3 is a flowchart of a photographing method according to an example of the present disclosure. As shown in FIG. 3, the photographing method includes the following operations.

In S101, external data is acquired by an under-screen light sensor.

In the example, the external data acquired by the under-screen light sensor is the second optical signal value obtained by acquiring ambient light using the light sensor under the display screen when the camera acquires image.

In S102, external illumination influence is removed and illumination influence of the current screen is obtained.

In the example, the external illumination influence is removed to obtain the light influence of the current screen, that is, the second optical signal value from the ambient light acquired by the light sensor is subtracted from the first optical signal value to remove the external illumination influence to obtain the screen influence value of the display screen.

In S103, illumination influence of the current screen is subtracted from data of the under-screen camera.

In the example, the illumination influence of the current screen is subtracted from the data of the under-screen camera, that is, the screen influence value of the display screen is subtracted from the first optical signal value, so as to remove interference from the luminance of the display screen.

In S104, imaging data of the under-camera is output.

In the example, after the interference from the luminance of the display screen is removed, the image may be generated and output.

It will be appreciated that in the example, the data acquired by the camera is compensated by the conventional under-screen light sensor, so that the generated image can restore the photographed object more accurately by means of data compensation, thereby improving the photographing quality.

Figure 4:
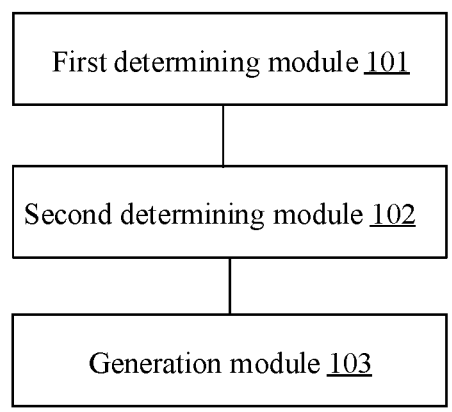
FIG. 4 is a diagram of a photographing apparatus according to an example.

FIG. 4 is a diagram of a photographing apparatus according to an example. Referring to FIG. 4, the apparatus is applied to a terminal including a camera and a display screen, the camera being disposed under the display screen. The photographing apparatus includes a first determining module 101, a second determining module 102 and a generation module 103.

The first determining module 101 is configured to determine a first optical signal value acquired by the camera at the time of photographing;

The second determining module 102 is configured to determine a screen influence value of the display screen based on at least a second optical signal value acquired by a light sensor.

The generation module 103 is configured to generate an image based on the first optical signal value and the screen influence value.

Optionally, the second determining module 102 is specifically configured to determine a second optical signal value that is acquired for the display screen of a current luminance by the light sensor in a dark room environment as the screen influence value of the display screen. Luminance of ambient light in the dark room environment is less than a preset luminance threshold.

Optionally, the second optical signal value acquired for the display screen of the current luminance is: an optical signal acquired for the display screen when the light sensor is disposed under the display screen and is adjacent to the camera.

Optionally, the apparatus further includes an acquisition module 104.

The acquisition module 104 is configured to acquire, at the time of photographing through the camera, ambient light by a light sensor under the display screen to obtain the second optical signal value.

The second determining module 102 is specifically configured to subtract the second optical signal value of the ambient light acquired by the light sensor from the first optical signal value to obtain the screen influence value of the display screen.

Optionally, the screen influence value includes a light emission spectral value of the screen.

The generation module 103 is specifically configured to calculate a difference value between the first optical signal value and spectral values in the light emission spectral value according to different wavelength components corresponding to different spectrums, to obtain color values of the image at the corresponding wavelength components, and obtain the image based on the color values.

With respect to the apparatus in the above-described examples, the specific manner in which the various modules perform operations has been described in detail in the examples relating to the method, and will not be described in detail herein.

Figure 5:
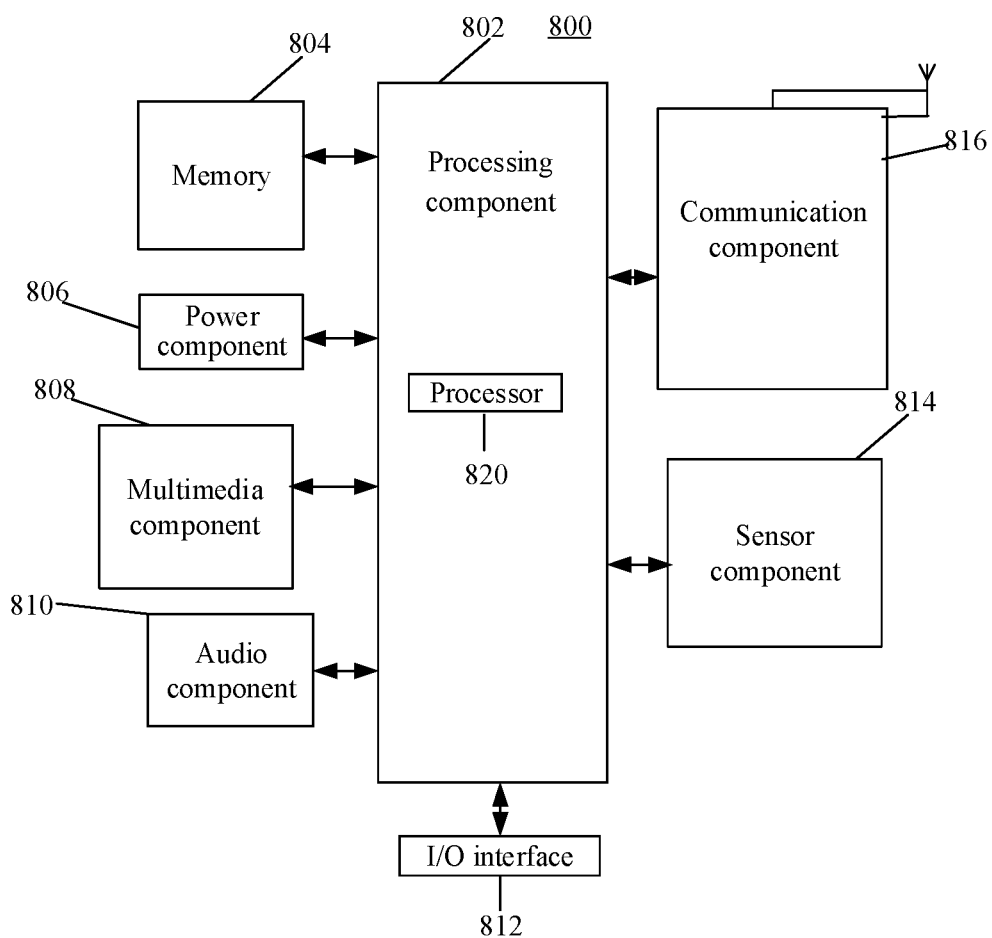
FIG. 5 is a block diagram of a terminal according to examples of the present disclosure.

FIG. 5 is a block diagram of a terminal device 800 according to an example. For example, the device 800 may be a mobile phone, a computer, or the like.

Referring to FIG. 5, the device 800 may include one or more of: a processing component 802, a memory 804, a power component 806, a multimedia component 808, an audio component 810, an input/output (I/O) interface 812, a sensor component 814, and a communication component 816.

The processing component 802 generally controls the overall operation of the device 800, such as operations associated with displays, telephone calls, data communications, camera operations, and recording operations. The processing component 802 may include one or more processors 820 to execute instructions to perform all or a portion of the steps of the methods as described above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations of the device 800. Examples of such data include instructions for any application or method operating on the device 800, contact data, phone book data, messages, pictures, video, etc. The memory 804 may be implemented by any type of volatile or non-volatile storage device or combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk, or optical disk.

The power component 806 provides power to various components of the device 800. The power component 806 may include a power management system, one or more power supplies, and other components associated with generating, managing, and distributing power for the device 800.

The multimedia component 808 includes a screen providing an output interface between the device 800 and the user. In some examples, the screen may include a liquid crystal display (LCD) and a touch panel (TP). If the screen includes the TP, the screen may be implemented as a touch screen to receive input signals from a user. The TP includes one or more touch sensors to sense gestures on the touch, slide, and TP. The touch sensor may not only sense the boundary of a touch or sliding action, but also detect a period of time and a pressure associated with the touch or sliding operation. In some examples, the multimedia component 808 includes a front camera and/or a rear camera. The front camera and/or the rear camera may receive external multimedia data when the device 800 is in an operating mode, such as a photographing mode or a video mode. Each of the front and rear cameras may be a fixed optical lens system or have a focal length and optical zoom capability.

The audio component 810 is configured to output and/or input audio signals. For example, the audio component 810 includes a microphone (MIC) configured to receive external audio signals when the device 800 is in an operating mode, such as a call mode, a recording mode, and a speech recognition mode. The received audio signal may be further stored in the memory 804 or transmitted via the communication component 816. In some examples, the audio component 810 further includes a speaker for outputting an audio signal.

The I/O interface 812 provides an interface between the processing component 802 and peripheral interface modules, which may be a keyboard, a click wheel, a button, or the like. These buttons may include, but are not limited to, a home button, a volume button, an activation button, and a locking button.

The sensor component 814 includes one or more sensors for providing a state assessment of various aspects of the device 800. For example, the sensor component 814 may detect an open/closed state of the device 800, a relative positioning of the components, such as a display and keypad of the device 800, the sensor component 814 may also detect a change in position of the device 800 or one of the components of the device 800, the presence or absence of user contact with the device 800, an orientation or acceleration/deceleration of the device 800, and a change in temperature of the device 800. The sensor component 814 may include a proximity sensor configured to detect the presence of a nearby object in the absence of any physical contact. The sensor component 814 may also include a light sensor, such as a CMOS or CCD picture sensor, for use in imaging applications. In some examples, the sensor component 814 may also include an acceleration sensor, a gyroscope sensor, a magnetic sensor, a pressure sensor, or a temperature sensor.

The communication component 816 is configured to facilitate wired or wireless communication between the device 800 and other devices. The device 800 may access a wireless network based on a communication standard, such as Wi-Fi, 2G or 3G, or a combination thereof. In an example, the communication component 816 receives broadcast signals or broadcast-related information from an external broadcast management system via a broadcast channel. In an example, the communication component 816 further includes a near field communication (NFC) module to facilitate short-range communication. For example, the NFC module may be implemented based on Radio Frequency Identification (RFID) technology, Infrared Data Association (IrDA) technology, Ultra Wideband (UWB) technology, Bluetooth (BT) technology, and other technologies.

In an example, the device 800 may be implemented by one or more application specific integrated circuits (ASICs), digital signal processors (DSPs), digital signal processing devices (DSPD), programmable logic devices (PLDs), field programmable gate arrays (FPGAs), controllers, microcontrollers, microprocessors, or other electronic components for performing the methods described above.

In an example, there is also provided anon-transitory computer-readable storage medium including instructions, such as the memory 804 including instructions executable by processor 820 of the device 800 to perform the above-described methods. For example, the non-transitory computer-readable storage medium may be a ROM, a random access memory (RAM), a CD-ROM, a magnetic tape, a floppy disk, an optical data storage device, or the like.

A non-transitory computer-readable storage medium is provided. When instructions in the storage medium are executed by a processor of a terminal, enable the terminal to perform a control method, the terminal including a camera and a display screen, and the camera being disposed under the display screen. The method includes:
determining a first optical signal value acquired by the camera at the time of photographing;
determining a screen influence value of the display screen based on at least a second optical signal value acquired by a light sensor; and
generating an image based on the first optical signal value and the screen influence value.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other examples of the present disclosure will readily occur to those skilled in the art upon consideration of the specification and practice disclosed herein. The disclosure is intended to cover any variations, uses, or adaptations of the disclosure following the general principles thereof and including such departures from the disclosure as come within known or customary practice in the art. It is intended that the specification and examples are to be regarded as exemplary only.

It is to be understood that the present disclosure is not limited to the exact construction that has been already described above and illustrated in the accompanying drawings, and that various modifications and changes may be made without departing from the scope thereof.

The invention claimed is:

1. A photographing method, applied to a terminal including a camera and a display screen, the camera being disposed under the display screen, comprising:
determining a first optical signal value acquired by the camera at the time of photographing;
determining a screen influence value of the display screen based on at least a second optical signal value acquired by a light sensor, wherein the first optical signal value is a value of color information corresponding to both a screen light of the display screen and ambient light, and the second optical signal value is an optical signal value at a respective wavelength obtained by the light sensor acquiring an optical signal according to color channels; and
generating an image based on the first optical signal value and the screen influence value,
wherein the screen influence value comprises a light emission spectral value of the display screen, and
generating the image based on the first optical signal value and the screen influence value comprises:
calculating a difference between the first optical signal value and the light emission spectral value according to different wavelength components corresponding to different spectrums, to obtain color values of the image at the corresponding wavelength components; and
obtaining the image based on the color values.

2. The method of claim 1, wherein determining the screen influence value of the display screen based on at least the second light signal value acquired by the light sensor comprises:
  determining a second optical signal value that is acquired for the display screen of a current luminance by the light sensor in a dark room environment as the screen influence value of the display screen, wherein luminance of ambient light in the dark room environment is less than a preset luminance threshold.

3. The method of claim 2, wherein the second optical signal value acquired for the display screen of the current luminance is: an optical signal acquired for the display screen when the light sensor is disposed under the display screen and is adjacent to the camera.

4. The method of claim 1, further comprising:
  acquiring, at the time of photographing by the camera, the ambient light by a light sensor under the display screen to obtain the second optical signal value; and
  wherein determining the screen influence value of the display screen based on at least the second optical signal value acquired by the light sensor comprises:
  subtracting the second optical signal value of ambient light acquired by the light sensor from the first optical signal value to obtain the screen influence value of the display screen.

5. A photographing apparatus, applied to a terminal including a camera and a display screen, the camera being disposed under the display screen, comprising:
  a processor;
  a memory for storing instructions executable by the processor;
  wherein the processor is configured to:
  determine a first optical signal value acquired by the camera at the time of photographing;
  determine a screen influence value of the display screen based on at least a second optical signal value acquired by a light sensor, wherein the first optical signal value is a value of color information corresponding to both a screen light of the display screen and ambient light, and the second optical signal value is an optical signal value at a respective wavelength obtained by the light sensor acquiring an optical signal according to color channels; and
  generate an image based on the first optical signal value and the screen influence value,
  wherein the screen influence value comprises a light emission spectral value of the display screen, and
  the processor is further configured to:
  calculate a difference between the first optical signal value and the light emission spectral value according to different wavelength components corresponding to different spectrums, to obtain color values of the image at the corresponding wavelength components; and
  obtain the image based on the color values.

6. The apparatus of claim 5, wherein the processor is further configured to:
  determine a second optical signal value that is acquired for the display screen of a current luminance by the light sensor in a dark room environment as the screen influence value of the display screen, wherein a luminance of ambient light in the dark room environment is less than a preset luminance threshold.

7. The apparatus of claim 6, wherein the second optical signal value acquired for the display screen of the current luminance is: an optical signal acquired for the display screen when the light sensor is disposed under the display screen and is adjacent to the camera.

8. The apparatus of claim 5, wherein the processor is further configured to:
  acquire, at the time of photographing by the camera, the ambient light by a light sensor under the display screen to obtain the second optical signal value; and
  subtract the second optical signal value of the ambient light acquired by the light sensor from the first optical signal value to obtain the screen influence value of the display screen.

9. A non-transitory computer-readable storage medium, wherein instructions in the storage medium, when executed by a processor of a terminal, cause the terminal to perform:
  determining a first optical signal value acquired by the camera at the time of photographing;
  determining a screen influence value of the display screen based on at least a second optical signal value acquired by a light sensor, wherein the first optical signal value is a value of color information corresponding to both a screen light of the display screen and ambient light, and the second optical signal value is an optical signal value at a respective wavelength obtained by the light sensor acquiring an optical signal according to color channels; and
  generating an image based on the first optical signal value and the screen influence value,
  wherein the screen influence value comprises a light emission spectral value of the display screen, and
  the instructions caused the processor to perform generating the image based on the first optical signal value and the screen influence value further cause the processor to perform:
  calculating a difference between the first optical signal value and the light emission spectral value according to different wavelength components corresponding to different spectrums, to obtain color values of the image at the corresponding wavelength components; and
  obtaining the image based on the color values.

10. The non-transitory computer-readable storage medium of claim 9, wherein the instructions caused the processor to perform determining the screen influence value of the display screen based on at least the second light signal value acquired by the light sensor further cause the processor to perform:
  determining a second optical signal value that is acquired for the display screen of a current luminance by the light sensor in a dark room environment as the screen influence value of the display screen, wherein luminance of ambient light in the dark room environment is less than a preset luminance threshold.

11. The non-transitory computer-readable storage medium of claim 10, wherein the second optical signal value acquired for the display screen of the current luminance is: an optical signal acquired for the display screen when the light sensor is disposed under the display screen and is adjacent to the camera.

12. The non-transitory computer-readable storage medium of claim 9, wherein the instructions further cause the processor to perform:
  acquiring, at the time of photographing by the camera, the ambient light by a light sensor under the display screen to obtain the second optical signal value; and
  wherein the instructions caused the processor to perform determining the screen influence value of the display screen based on at least the second optical signal value acquired by the light sensor further cause the processor to perform:

subtracting the second optical signal value of ambient light acquired by the light sensor from the first optical signal value to obtain the screen influence value of the display screen.

\* \* \* \* \*